Sept. 5, 1961 T. W. GLYNN 2,999,043
BUILDING FACING PANEL
Filed May 23, 1960
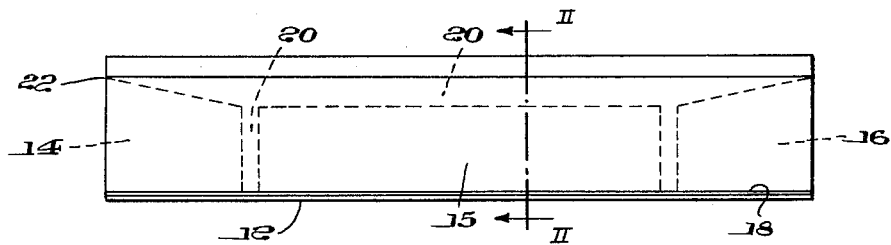
Fig. 1.
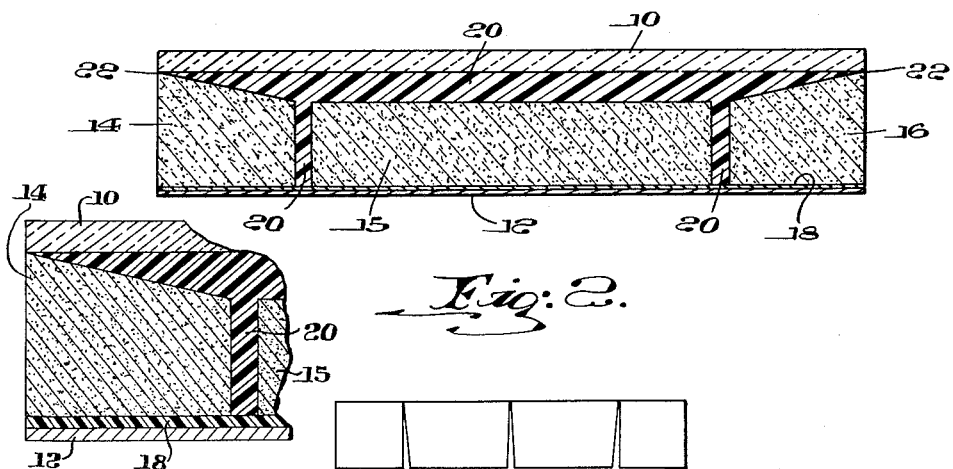
Fig. 2.
Fig. 4.
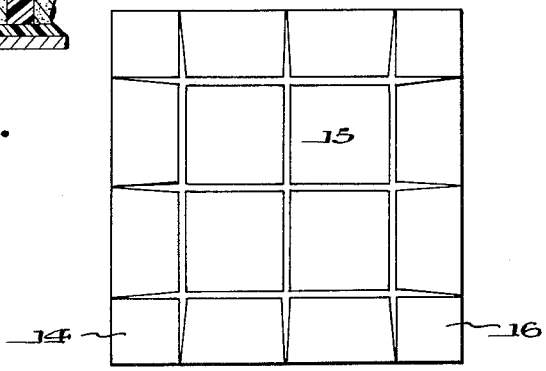
Fig. 3.
INVENTOR.
THEODORE W. GLYNN.
BY
Brown, Critellow, Glick & Peckham
his ATTORNEYS.

United States Patent Office 2,999,043
Patented Sept. 5, 1961

2,999,043
BUILDING FACING PANEL
Theodore W. Glynn, Kingsport, Tenn., assignor to American-Saint Gobian Corporation, a corporation of Delaware
Filed May 23, 1960, Ser. No. 30,985
2 Claims. (Cl. 154—118)

This invention relates to building facing panels in which the exposed facing member, or surface, is composed of a sheet of tempered glass.

In the materials available on the commercial market that serve as facing panels for buildings are included several glass type panels. Characteristically, these comprise a sheet of glass as the outside surface and which either may be plain or enameled, a backing member for rigidity and for applying or attaching the resulting member to the building structure, and a suitable adhesive to join the backing member and glass surface. In another type of building panel the glass surface and the rigid backing member are spaced by a block of insulating material. In such structures, it is quite common to use an enclosing metallic casing to hold the unit together as well as to seal the ends.

Where a large building panel is to be provided, difficulties are encountered in joining the glass facing member to insulating spacing members. For example, substantially all large tempered glass sheets used for these purposes are bowed or warped because it would be too expensive to make the surfaces perfectly flat. Moreover, with a large panel more than a single insulating spacing member would be used as a consequence of the limited sizes in which such members are available. Insulating spacing members, such as cellular glass block, are not of uniform thickness. With such characteristics of the elements, conventional practices cannot be readily applied in forming large size building panels.

An additional characteristic that is sought in building panels is good insulating quality. Metal casings used as end members to span the thickness of a unit serve to decrease the insulating qualities of the product as a consequence of the relatively high thermal conductivity of metal.

It is therefore the primary object of the present invention to provide building facing panels comprising a glass facing or exterior associated with a plurality of cellular incombustible insulating elements and a flat, rigid inside surface or backing member, that is lightweight yet sturdy, that provides good heat insulation, that is essentially incombustible, that is moisture proof, that is relatively inexpensive and simple to produce and thereby avoids the difficulties encountered with presently known building facing panels.

The invention will be best understood upon considering its description in conjunction with the attached drawing in which:

FIG. 1 is a side view of a building panel made in accordance with this invention;

FIG. 2 is a cross-sectional view through a panel in accordance with FIG. 1, taken along line II—II;

FIG. 3 shows an arrangement of 16 blocks as used in a panel of this invention; and FIG. 4 is an enlarged view of a portion of the panel of FIG. 2.

In its simplest embodiment, a building facing panel in accordance with this invention comprises a sheet of tempered glass, a thin, flat, rigid backing member, and a plurality of essentially incombustible cellular insulating blocks disposed between the sheet and backing member. The backing member is attached to the blocks by use of a non-expandable adhesive. The sheet of tempered glass is attached to the other surfaces of the blocks by the use of a resilient foamed synthetic resin that adhesively joins them.

The building panels with which this invention is concerned are those that are in sizes of 3 x 4 feet or larger. Tempered glass sheets of that size are almost invariably bowed, concave, or warped. For example, the three major tempered sheet glass manufacturers specify a range of about 5/16 to 1/2 inch bow or warp for a 7 to 8 foot length of 1/4 inch thick glass. Accordingly, in my building panels, the outside or facing surface is not flat, but rather is bowed. I retain that bow in the finished unit by attaching the sheet of glass to the cellular glass blocks by a resilient adhesive, and thereby avoid inducing unnecessary strains in the facing member.

The glass sheet generally is tempered, or heat strengthened, in the manner well known in the glass art. However, annealed low expansion glass may be used because the strong adherence of the expandable adhesives, hereinafter described, to the glass prevents pieces of glass from falling out if the glass should become cracked or broken. For most purposes, however, it is preferred to use low expansion borosilicate glass. Such glass will withstand heat that would break ordinary lime glass, tempered or untempered, and if it should be cracked by heat it would tend to stay in place. Borosilicate glass is advantageous also because under atmospheric conditions it stays cleaner than do ordinary sheet, or lime, glasses.

Color for the exterior side of the panel may be provided, if desired, in a variety of ways. Thus, colored foam may be used, colored glass may be used, or the interior surface of a colorless glass sheet may be painted with a suitable colored paint, preferably an epoxy resin paint. Epoxy paints are desirable because they adhere well to glass and do not become brittle with time. Alternatively, lustrous effects may be provided by applying to the interior surface of the glass a transparent film of metal, such as bronze or stainless steel, followed by application of a continuous coating of a different metal that is fused to the first film. Suitably both coatings are sprayed, and the outer metallic coating consists of aluminum to provide a reflective backing surface, as disclosed in my copending application Serial No. 671,711, filed July 15, 1957, now abandoned. Still another way of supplying color to lime glasses is to apply a colored enamel to the inside surface of the glass sheet, heating the combination above the annealing point of the glass to fire the enamel into it, then cooling to a temperature at which finely divided aluminum will adhere, and spraying aluminum over the enameled surface, as described in my copending application Serial No. 566,035, filed February 16, 1956, now abandoned.

Insulating blocks form the interior of the building panels of the invention. Usually these are cellular glass block such as that sold as "Foamglas." For the size panel contemplated, a plurality of blocks is used since these materials are available in but a limited range of sizes. Glass block are not of uniform thickness; consequently, an additional advantage in jointing the block to the sheet of glass by an expandable adhesive is that such an adhesive naturally adapts to filling the varying clearances between the sheet and the blocks.

Prior to forming a facing panel of this invention, the cellular glas blocks have a thickness, or height, along their exterior edges that is slightly greater than the desired spacing between the glass sheet and the backing member. Accordingly, upon joining these members in a press, where it is not uncommon to apply as much pressure as 1 ton per square foot of panel surface, the block at those edge surfaces crushes slightly and thereby conforms to surface irregularities of the glass sheet and provides a moisture proof seal. For this purpose, the surface of each block adjacent the sheet of glass, is treated to remove a portion of that surface away from the exterior edges, to avoid interference with securing the desired seal.

The backing member of these panels not infrequently serves as the inside wall of a building that is to be faced. A wide variety of materials can be used in the backing member. For example, low carbon steel sheet, galvanized or aluminized steel, aluminum, stainless steel, Formica, plasterboard or plywood can be used. There may be used likewise insulating and reflective paper products such as aluminum foil cemented to one or both faces of paper. Other materials and combinations will occur to those familiar with this field.

The blocks are joined to the backing member by a non-elastic adhesive of which numerous types are available commercially. Various water-proof glues, non-expandable neoprene rubbers, non-foaming silicone rubbers, bituminous and asphaltic compositions can be used for this purpose.

Various resilient foamed resins are available for joining the glass sheet to the cellular blocks. Thus, polyurethane foams are well known in the plastic art so that detailed discussion of them is unnecessary. Briefly, they represent reaction products of diisocyanates with such compounds as polyesters, polyesteramides, alkylene glycols, polyoxyalkylene glycols, and others. In general, when the two reactants are mixed there is added a catalyst or other agent productive of gas that converts the reaction product to its desired foamed, cellular structure. One such practice is to add a restricted amount of water that reacts with the isocyanate with liberation of carbon dioxide that effects the foaming.

Various polyurethane foams are available, examples being "Nopco Lockfoam" sold by Nopco Chemical Company, and "Scotchfoam I" sold by Minnesota Mining and Manufacturing Company.

Another type of foam suited to the purposes of the invention are the resilient silicone rubber foams sold as "Silastic Q-3-003" and "Silastic Q-3-0031" by the Dow Corning Corporation. These are especially desirable where optimum fire resistance is desired. They have excellent flexibility over a wide temperature range, and they exert little foaming pressure so that only the lightest of molds are needed. Excellent adhesion to metals and other smooth materials is to be had by first treating the surfaces with a special primer to be had from the resin supplier.

Referring now to the drawings, a building panel of the invention comprises a facing sheet 10 of glass. The sheet is initially bowed or warped and may be plain or enameled as desired. A backing member 12 made, for example, of low carbon steel or other material, is spaced from the sheet 10 of glass by a plurality of blocks 14, 15 and 16 composed preferably of cellular glass. A layer 18 of a waterproof non-expandable adhesive separates and serves to join the bottoms of the blocks to the backing member. The spaces between the blocks and between the surfaces of the blocks and the glass sheet are filled with an expandable plastic adhesive 20 that completely fills these spaces and serves to join the blocks to one another and the sheet of glass to the blocks.

The edge blocks 14 and 16 are shaped along their upper surface so that the thickness or height along their exterior edges exceeds their thickness at any other point. In forming the panels, the edges of these blocks crushes slightly as at 22, making a moisture proof seal and permitting the cellular blocks to conform to such irregularities as may exist along that portion of the glass sheet.

The foamed resin 20 that fills the spaces between blocks and between the glass sheet 10 and the blocks is characterized by strong adhesive qualities. The filling of these spaces is insured since when the resin is foamed in place, it exerts a substantial pressure on the order of 10 to 15 p.s.i., which forces the resin into all of the unoccupied volume. This substantial pressure would be enough to displace the glass blocks and move them sideways, but for the friction developed by the crushing of the beveled edge of the exterior blocks by the tempered glass facing member. The elasticity of the foam is particularly desirable for not only does it insure against shock damage, but it also permits the glass sheet in a finished panel to revert to its normal position, i.e. to bow, thereby releasing such strains as may have been induced during forming.

In the production of units in accordance with the invention, the backing member 12 is laid in a suitable mold, and then the non-expandable adhesive 18, such as a waterproof glue, is applied to it. Before the glue dries or sets, the cellular glass blocks are placed in the mold on the glue. By way of example, forty blocks of 12 by 18 in. size are generally used for a 5 by 12 ft. panel, with the outside blocks being thicker than those used for the center. Then an amount of foamable resin along with a foaming agent, calculated to fill the spaces completely, is added. The glass sheet is then set in place and the unit is placed in a press capable of exerting a pressure on the order of about 1 ton per square foot. With the aplication of pressure, the edge surfaces of the exterior bricks crush under the pressure of the press applied through the glass sheet 10 and seal the edges. The panel remains in the press under these conditions until the resin and glue set. This may be a few seconds to several minutes depending on the particular materials used.

From the foregoing description and discussion, it will be apparent that the present invention provides building facing panels, in which a sheet of glass comprises the outside surface, that are sturdy and uniquely characterized by a particularly good moistureproof seal around the exterior edges. Moreover, since there are no metallic units spanning the width of the panels, the heat insulation characteristics imparted by the cellular glass block insulating members are considerably better than in the panels known heretofore.

In addition to the advantages already described, the elasticity of the foam compensates for such differential expansion of the elements of a panel as may exist. This is particularly important where color is applied by painting the back of the glass sheet because if ordinary adhesive were used, the difference in the expansion of the glass and the "Foamglas" might break the paint film loose from the glass and thus adversely affect its appearance.

This is a continuation-in-part of my copending application Serial No. 785,482, filed January 7, 1959.

In accordance with the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A sealed, moisture-proof, building facing panel comprising a sheet of initially bowed, tempered glass, a thin rigid backing member, a plurality of cellular glass blocks disposed between said sheet and backing member, a foamed synthetic resin adhesively joining said glass sheet to said blocks and the edges of said blocks to each other, and a non-expandable adhesive joining said blocks to said backing, the blocks at the outside edge of the panel having an initial height at their exterior edges that is slightly greater than the desired spacing of said sheet and backing, whereby upon joining said glass, backing member and blocks with said adhesives under pressure, the edge surface of said blocks in contact with said sheet crushes slightly to conform to surface irregularities of the glass sheet and provide a moistureproof seal.

2. In the manufacture of a building facing panel comprising a sheet of initially bowed glass, a thin rigid backing member, a plurality of cellular glass blocks disposed between said sheet and backing member, and adhesives to join said members to one another, the steps of using edge blocks in said structure having exterior edges slightly greater in height than the desired spacing of said sheet and backing, pressing said sheet of glass against said blocks at a pressure sufficient to crush said edge surfaces, and maintaining said pressure for a period of time sufficient to permit said adhesives to cure.

References Cited in the file of this patent

UNITED STATES PATENTS

| | | |
|---|---|---|
| 2,150,809 | Rugg et al. | Mar. 14, 1939 |
| 2,268,251 | Haux | Dec. 30, 1941 |
| 2,569,720 | Buck et al. | Oct. 2, 1951 |
| 2,595,728 | Swiss et al. | May 6, 1952 |
| 2,780,350 | Siman et al. | Feb. 5, 1957 |
| 2,868,008 | Taulmin | Jan. 13, 1959 |
| 2,888,360 | Sherts et al. | May 26, 1959 |

FOREIGN PATENTS

| | | |
|---|---|---|
| 765,330 | Great Britain | Dec. 28, 1956 |
| 1,171,843 | France | Oct. 6, 1958 |